United States Patent
Borucki

(10) Patent No.: US 8,365,984 B2
(45) Date of Patent: Feb. 5, 2013

(54) TECHNIQUES FOR DISPARATE BARCODE TRANSACTION PROCESSING

(75) Inventor: Robert Thomas Borucki, Mesa, AZ (US)

(73) Assignee: NCR Corporation, Duluth, GA (US)

(*) Notice: Subject to any disclaimer, the term of this patent is extended or adjusted under 35 U.S.C. 154(b) by 164 days.

(21) Appl. No.: 12/925,263

(22) Filed: Oct. 18, 2010

(65) Prior Publication Data

US 2012/0091194 A1 Apr. 19, 2012

(51) Int. Cl.
*G06K 5/00* (2006.01)
(52) U.S. Cl. .................................. 235/375; 235/381
(58) Field of Classification Search .................. 235/375, 235/380, 382, 383, 492
See application file for complete search history.

(56) References Cited

U.S. PATENT DOCUMENTS

| | | | |
|---|---|---|---|
| 2004/0193464 A1* | 9/2004 | Szrek et al. | 705/7 |
| 2005/0137916 A1* | 6/2005 | McElhannon | 705/5 |
| 2006/0289633 A1* | 12/2006 | Moreland et al. | 235/381 |
| 2009/0183008 A1* | 7/2009 | Jobmann | 713/186 |
| 2010/0287057 A1* | 11/2010 | Aihara et al. | 705/16 |

* cited by examiner

*Primary Examiner* — Thien M Le
(74) *Attorney, Agent, or Firm* — Joseph P. Merhle; Paul W. Martin

(57) ABSTRACT

Techniques for disparate barcode transaction processing are provided. A first barcode associated with a first service is presented at a self-service device, which is associated with processing a second barcode for a second service; the first barcode is disparate from the second barcode. The self-service device identifies the second barcode as a foreign barcode and consults an external service. The external service identifies a next transaction of an itinerary for a customer associated with the second barcode and communicates that to the self-service device. The self-service device completes the next transaction on behalf of the customer.

24 Claims, 3 Drawing Sheets

TECHNIQUES FOR DISPARATE BARCODE TRANSACTION PROCESSING

BACKGROUND

Modern travel confirmations (receipts, boarding passes) are often accompanied nowadays by a barcode, which can be used to conduct transactions with the supplier issuing the confirmations. For example, it has become standard for airlines to include a barcode on boarding passes. The airline barcode includes relevant passenger and itinerary data, and the barcode is used to initiate transactions at kiosks equipped with barcode readers, as well as at agent positions such as the boarding gate door.

Although machine readable travel information is efficient for suppliers, the proliferation of bar coded documents can easily become a burden on the traveler. For instance, a typical round trip overnight journey can easily include two airline boarding passes (one for outbound and one for return), a car rental confirmation, and a hotel confirmation. Barcodes on each of these documents contain different data and barcode formats are generally not interoperable between travel suppliers (i.e. between airlines) let alone between different segments of the travel landscape (i.e. between airlines and hotels).

SUMMARY

In various embodiments, techniques for disparate barcode transaction processing are presented. According to an embodiment, a method for disparate barcode transaction processing is provided.

Specifically, a barcode is received from a self-service device over a network connection; the barcode is unrecognized by the self-service device. Next, the barcode is associated with an itinerary of a customer and a transaction is acquired from the itinerary that is associated with the self-service device for the customer. Finally, identifying information is sent to the self-service device over the network connection for purposes of completing the transaction on behalf of the customer at the self-service device.

DETAILED DESCRIPTION

Figure 1:
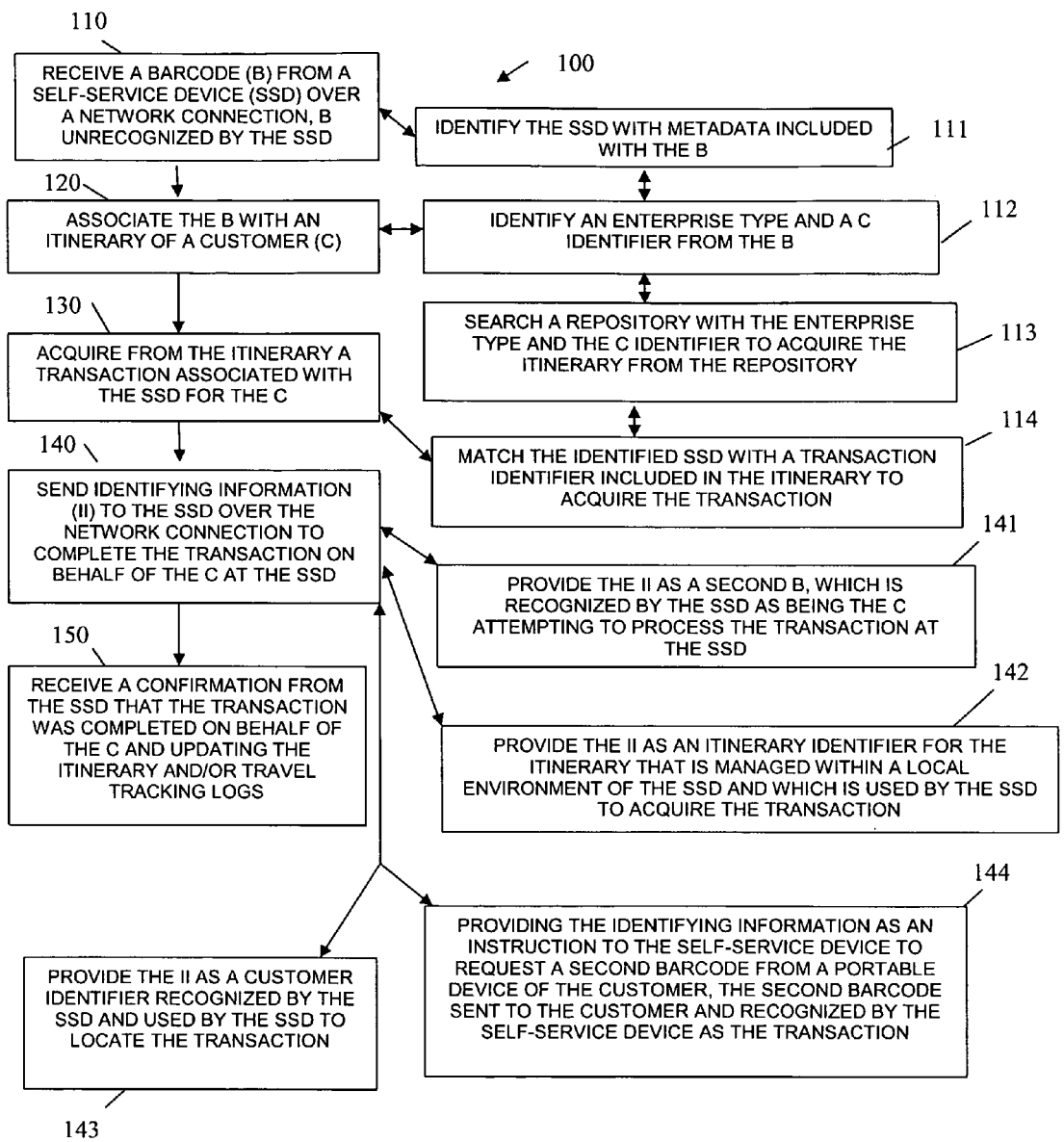
FIG. 1 is a diagram of a method for disparate barcode transaction processing, according to an example embodiment.

FIG. 1 is a diagram of a method 100 for disparate barcode transaction processing, according to an example embodiment. The method 100 (hereinafter "cloud-based barcode processing service") is implemented as instructions residing on a non-transitory computer-readable (processor-readable) storage medium and executed by one or more processors. The processors are specifically configured and programmed to process the cloud-based barcode processing service. The cloud-based barcode processing service operates over a network. The network is wired, wireless, or a combination of wired and wireless.

In an embodiment, the cloud-based barcode processing service executes on one or more processors over the network in a cloud processing environment.

Cloud computing is often defined as computing capabilities that provide an abstraction between computing resources and the underlying technical architecture (e.g., servers, storage, networks), enabling convenient, on-demand network access to a shared pool of configurable computing resources that can be rapidly provisioned and released with minimal management effort or service provider interaction. From the perspective of the user, where and how a computing resource is irrelevant and transparent in cloud computing.

As used herein a "cloud processing environment" refers to a set of cooperating computing resources, such as machines, storage, software libraries, software systems, etc. that form a logical computing infrastructure.

At 110, the cloud-based barcode processing service receives a barcode from a self-service device, such as a kiosk. The barcode is unrecognized by the self-service device that sends the barcode to the cloud-based barcode processing service. That is, a customer provides a barcode to a scanner of a kiosk (self-service device). The barcode is associated with a different enterprise and a different transaction from that which is typically handled by the kiosk. For example, the kiosk may be a self-check in device at a hotel and the customer places his/her airline barcode for a boarding pass under the scanner of the kiosk. The kiosk is unsure of the barcode and does not recognize its format and content. In response, the kiosk sends the barcode to the cloud-based barcode processing service.

According to an embodiment, at 111, the cloud-based barcode processing service identifies the self-service device with metadata included with the barcode. In other words, the self-service device may authenticate or provide some other metadata with the barcode that provides the cloud-based barcode processing service with the ability to acquire a self-service device identity for the self-service device. So, the metadata, which is separate and in addition to the barcode, can include other independent information that assist in resolving who the customer is by the cloud-based barcode processing service. So, a customer name, profile, Personal Identification Number (PIN), or other identifier may be included with the metadata.

Continuing with the embodiment of 111 and at 112, the cloud-based barcode processing service identifies an enterprise type and a customer identifier from the barcode. At 113, the cloud-based barcode processing service uses the enterprise type and the customer identifier to search a repository for purposes of acquiring an itinerary from the repository.

The itinerary was previously registered by a customer. The customer subscribes to the cloud-based barcode processing service and then-registers trip itineraries. The itinerary includes details of the enterprises for a trip, dates of travel, location of travel, and the like. So, when the barcode is received, the cloud-based barcode processing service can parse portions of the information included in the barcode to search and locate the registered itinerary for the customer.

Continuing with the embodiment of 113 and 114, the cloud-based barcode processing service matches the identified self-service device (from 111) with a transaction identifier in the itinerary within the registered itinerary to acquire a transaction (discussed below). The transaction is part of the itinerary and is what the self-service device is designed to handle on behalf of the customer, even though the original barcode supplied by the customer was for an entirely different transaction of the itinerary.

At 120, the cloud-based barcode processing service associates the barcode with an itinerary of the customer. It is noted that the embodiments of 111-114 are but one processing scenario for acquiring and associating the barcode that the self-service device is unable to handle with a registered itinerary of the customer. So, at 120, other types of processing can be used to associate the barcode with the customer's registered itinerary.

At 130, the cloud-based barcode processing service acquires from the itinerary a transaction associated with the self-service device for the customer. So, as mentioned above at 114, the cloud-based barcode processing service identifies a transaction in the itinerary that the self-service device is designed to handle on behalf of the customer. In the example mentioned above, this is the hotel check-in transaction for the customer, where the customer is provided access keys to a room via the self-service device. The cloud-based barcode processing service identifies the transaction in the itinerary for which the self-service device can handle.

At 140, the cloud-based barcode processing service sends identifying information to the self-service device over the network connection for purposes of completing the transaction on behalf of the customer at the self-service device. The identifying information can be provided to the self-service device in a variety of mechanisms and formats for purposes of having the self-service device complete the transaction for the customer at the self-service device.

For example, at 141, the cloud-based barcode processing service provides the identifying information as a second barcode. The second barcode is recognizable by the self-service device as a particular barcode for which the self-service device is designed to handle. The self-service device recognizes the customer, via the second barcode, and the transaction that the customer desires to process at the self-service device.

In another situation, at 142, the cloud-based barcode processing service provides the identifying information as an itinerary identifier for the itinerary. The itinerary is managed within a local environment of the self-service device and is used by the self-service device to acquire the transaction. Here, the itinerary may have been previously pushed by the cloud-based barcode processing service to the local environment of the self-service device and the self-service device provides the barcode (which the self-service device cannot process) to the cloud-based barcode processing service to acquire an itinerary identifier, which then allows the self-service device to acquire the itinerary and ultimately the transaction that is to be processed for the customer via the self-service device.

In yet another situation, at 143, the cloud-based barcode processing service provides the identifying information as a customer identifier recognized by the self-service device and used by the self-service device to locate the transaction. In other words, the legacy enterprise system associated with the self-service device expects a particular customer identifier in a format that the legacy system can handle, the cloud-based barcode processing service knows the format and identifies the customer via the barcode (which the self-service device could not process) and then provides the customer identifier to the self-service device. Once the self-service device has the customer identifier the transaction can be located for the customer by calling up a reservation of the customer, via the customer identifier.

In still another circumstance, at 144, the cloud-based barcode processing service provides the identifying information as an instruction to the self-service device to request a second barcode from a portable device of the customer. The second barcode sent to the customer and recognized by the self-service device as the transaction. This scenario may be used for added security to ensure that the customer is legitimate the customer and not an imposter at the self-service device. For example, the cloud-based barcode processing service can instruct the self-service device to request a QR code from the customer and the cloud-based barcode processing service sends the QR code to a phone of the customer. The customer then places the QR code under the scanner and the self-service device completes the transaction. Other scenarios can be used here as well for security. For instance, the self-service device can ask a question that the customer registered with the cloud-based barcode processing service and when the proper answer is provided the transaction is completed.

In some cases, a registered profile for the customer may permit a credit card number of the customer to be used at the self-service device. So, the cloud-based barcode processing service could send back to the self-service device the credit card information for a customer to complete a transaction and payment for a sale in an automated fashion by acquiring the credit card information from a profile registered with the cloud-based barcode processing service.

Figure 2:
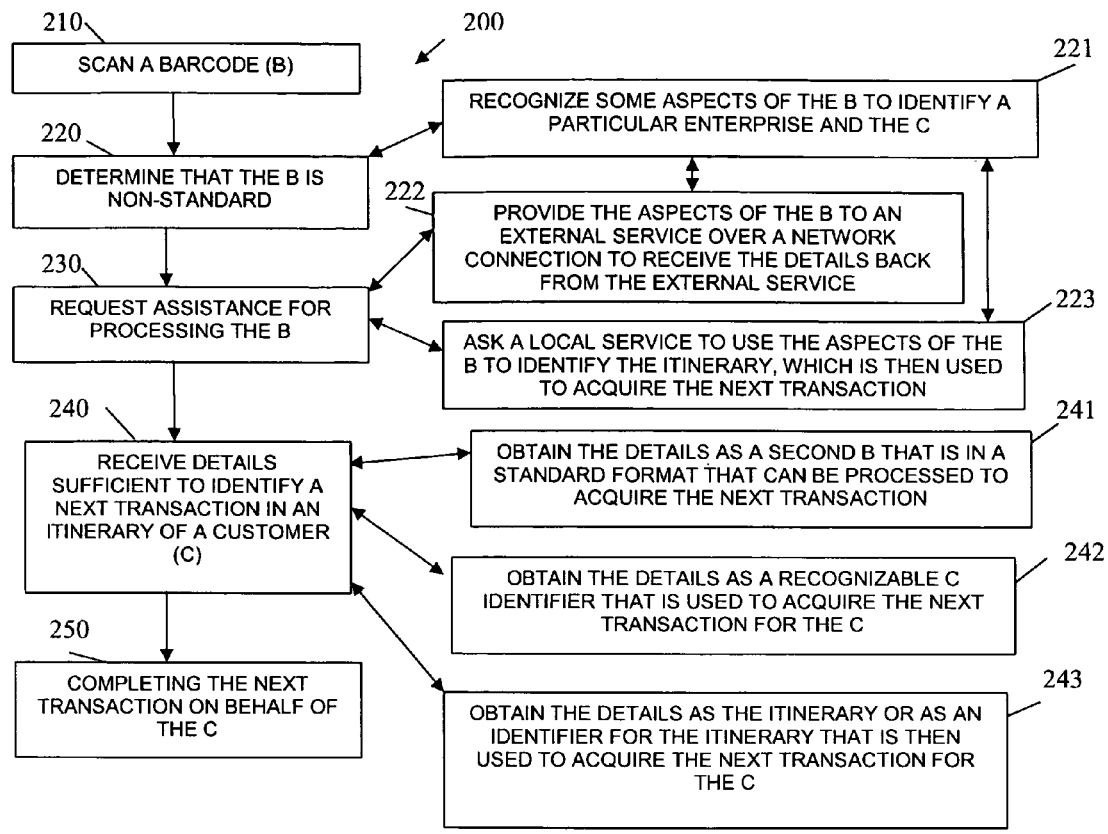
FIG. 2 is a diagram of another method for disparate barcode transaction processing, according to an example embodiment.

FIG. 2 is a diagram of another method 200 for disparate barcode transaction processing, according to an example embodiment. The method 200 (hereinafter "disparate barcode processing agent") is implemented as instruction within a non-transitory computer-readable (processor-readable) storage medium that executes on one or more processors; the processors are specifically configured to execute the disparate barcode processing agent. The disparate barcode processing agent is operational over a network; the network is wired, wireless, or a combination of wired and wireless.

The disparate barcode processing agent is presented from the perspective of operations occurring on a self-service device when a customer presents an unrecognizable or non-standard barcode to the self-service device. In this way, the disparate barcode processing agent interacts with the method 100 of the FIG. 1 to complete disparate barcode processing on behalf of a customer.

So, the disparate barcode processing agent is presented from the perspective of the self-service device whereas the method 100 is presented from the perspective of a server or cloud processing environment at interacts with the self-service device.

At 210, the disparate barcode processing agent scans a barcode (could also be a QR code, which is a form of a barcode). A customer places the barcode under a scanner of a device for which the disparate barcode processing agent is in communication with; resulting in the barcode being scanned and acquired by the disparate barcode processing agent.

At 220, the disparate barcode processing agent determines that the barcode is non standard. That is, the text of the barcode may be capable of being resolved but the format and the content of the text is not what the disparate barcode processing agent expects to see and handle.

According to an embodiment, at 221, the disparate barcode processing agent recognizes some aspects of the barcode to identify a particular enterprise and the customer. That is, the disparate barcode processing agent may be able to recognize an airline transaction for a code or text string associated with an airline and may identify what it believes to be part of a customer name from the non standard barcode.

Continuing with the embodiment of 221 and at 222, the disparate barcode processing agent provides the aspects of the barcode to an external service over a network connection for purposes of receiving back details from the external service that will assist the disparate barcode processing agent in completing a transaction on behalf of the customer. Here, the external service may be the method 100 of the FIG. 1, discussed above.

In another situation of 221 and at 223, the disparate barcode processing agent asks a local service to use the aspects of the barcode to identify the itinerary, which is then used to acquire the next transaction. In this way, local services or other agents within the local secure network of the disparate barcode processing agent are used to identify the itinerary and the next transaction for the itinerary for which the self-service device of the disparate barcode processing agent is to handle.

At 230, the disparate barcode processing agent requests assistance for processing the non-standard barcode. Again, some situations for requesting external help over a network and for requesting local help within a local network were presented above with the discussion of the processing at 221-223. This may also entail the disparate barcode processing agent sending additional metadata to the helping service in addition to the non-standard barcode, such as a PIN, profile, customer name or account, etc. (as discussed above with reference to the method 100 of the FIG. 1).

At 240, the disparate barcode processing agent receives details sufficient to identify a next transaction in an itinerary of a customer. The information and format of the details can vary.

For example, at 241, the disparate barcode processing agent obtains the details as a second barcode that is in a standard format that can be processed to acquire the next transaction by the self-service device. In other words, a standard formatted barcode that the self-service device is designed to handle is provided in the details to the disparate barcode processing agent so the next transaction associated with the self-service device can be processed.

In another scenario, at 242, the disparate barcode processing agent obtains the details as a recognizable customer identifier that is used to acquire the next transaction for the customer. Here, the customer identifier can be used to call up a reservation of the customer at an enterprise associated with the self-service device and that reservation identifies the next transaction for processing.

In still another case, at 243, the disparate barcode processing agent obtains the details as the itinerary or as an identifier for the itinerary that is then used to acquire the next transaction for the customer.

Figure 3:
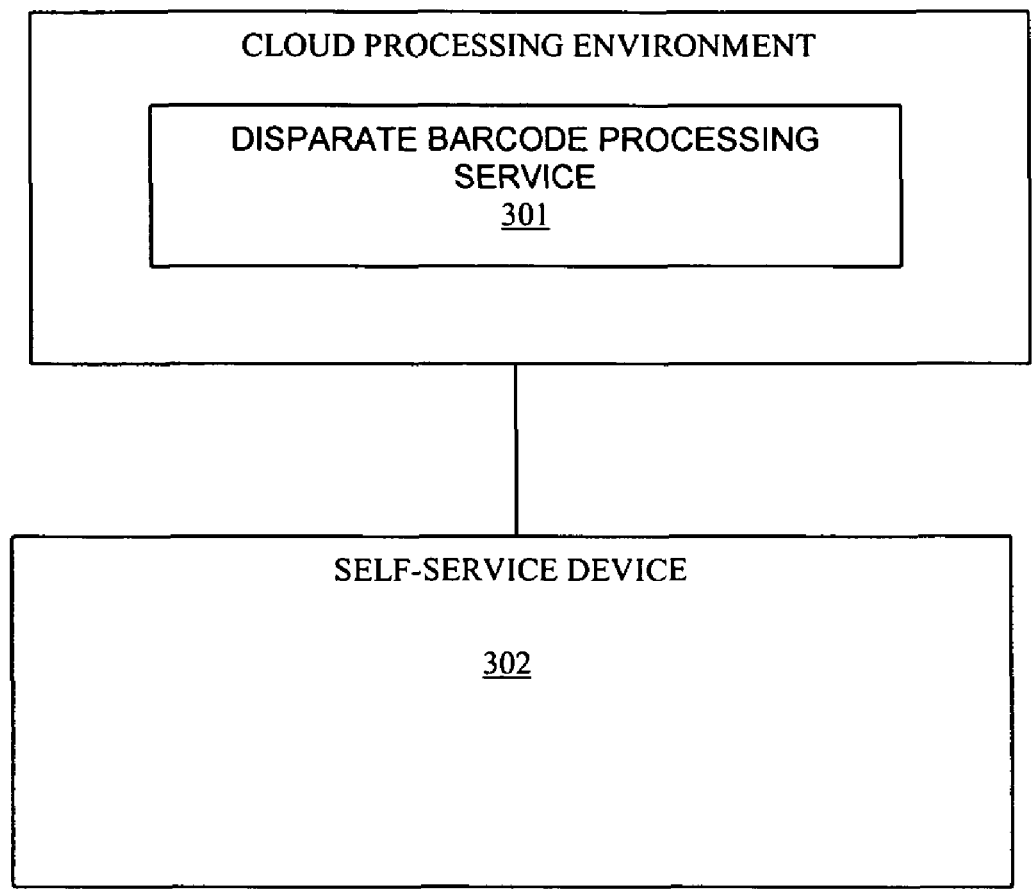
FIG. 3 is a diagram of a disparate barcode transaction processing system, according to an example embodiment.

FIG. 3 is a diagram of a disparate barcode transaction processing system 300, according to an example embodiment. The disparate barcode transaction processing system 300 includes one or more processors that are specifically configured to perform, inter alia, the processing associated with the methods 100 and 200 of the FIGS. 1 and 2, respectively. The disparate barcode transaction processing system 300 may also include a variety of other hardware components, such as network adapters, memory, display screen(s), input mechanisms, and the like. Furthermore, the disparate barcode transaction processing system 300 is operational over a network and the network can be wired, wireless, or a combination of wired and wireless.

The disparate barcode transaction processing system 300 includes a disparate barcode processing service 301 and a self-service device 302. Each of these and their interactions with one another will now be discussed in turn.

A cloud processing environment includes one or more processors and is configured and programmed with the disparate barcode processing service 301. The disparate barcode processing service 301 executes within the cloud processing environment. Example processing associated with the disparate barcode processing service 301 was presented above in detail with reference to the method 100 of the FIG. 1.

The disparate barcode processing service 301 is configured to handle a barcode that is not recognized by the self-service device 302 when presented the barcode from a customer. The disparate barcode processing service 301 is also configured to identify an itinerary for the customer and acquire a transaction in the itinerary, which can be processed by the self-service device 302.

Still further, the disparate barcode processing service 301 is configured to supply the transaction to the self-service device 302 and the self-service device 302 is configured to process the transaction on behalf of the customer.

According to an embodiment, the disparate barcode processing service 301 is also configured to identify the transaction as a second barcode recognized by the self-service device 302 as the transaction for processing by the self-service device 302.

In another case, the disparate barcode processing service 301 is configured to track actions against the itinerary in an audit log.

The self-service device 302 includes one or more processors and configured and programmed to interact with the disparate barcode processing service 301 over a network, such as but not limited to the Internet.

Processing associated with the self-service device 302 was presented above in detail with reference to the method 200 of the FIG. 2.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A processor-implemented method programmed in a non-transitory processor-readable medium and to execute on one or more processors configured to execute the method, comprising:
   receiving a barcode from a self-service device over a network connection, the barcode is unrecognized by the self-service device;
   associating the barcode with an itinerary of a customer;
   acquiring from the itinerary a transaction associated with the self-service device for the customer; and
   sending identifying information to the self-service device over the network connection to complete the transaction on behalf of the customer at the self-service device.

2. The method of claim 1, wherein receiving further includes identifying the self-service device with metadata included with the barcode.

3. The method of claim 2, wherein associating further includes identifying an enterprise type and a customer identifier from the barcode.

4. The method of claim 3, wherein identifying further includes searching a repository with the enterprise type and the customer identifier to acquire the itinerary from the repository.

5. The method of claim 4, wherein acquiring further includes matching the identified self-service device with a transaction identifier included in the itinerary to acquire the transaction.

6. The method of claim 1, wherein sending further includes providing the identifying information as a second barcode, which is recognized by the self-service device as being the customer attempting to process the transaction at the self-service device.

7. The method of claim 1, wherein sending further includes providing the identifying information as an itinerary identifier for the itinerary that is managed within a local environment of the self-service device and which is used by the self-service device to acquire the transaction.

8. The method of claim 1, wherein sending further includes providing the identifying information as a customer identifier recognized by the self-service device and used by the self-service device to locate the transaction.

9. The method of claim 1, wherein sending further includes providing the identifying information as an instruction to the self-service device to request a second barcode from a portable device of the customer, the second barcode sent to the customer and recognized by the self-service device as the transaction.

10. The method of claim 1 further comprising, receiving a confirmation from the self-service device that the transaction was completed on behalf of the customer and updating the itinerary and/or travel tracking logs.

11. A processor-implemented method programmed in a non-transitory processor-readable medium and to execute on one or more processors configured to execute the method, comprising:
    scanning a barcode;
    determining that the barcode is non-standard;
    requesting assistance for processing the barcode;
    receiving details sufficient to identify a next transaction in an itinerary of a customer; and
    completing the next transaction on behalf of the customer.

12. The method of claim 11, wherein determining further includes recognizing some aspects of the barcode to identify a particular enterprise and the customer.

13. The method of claim 12, wherein requesting further includes providing the aspects of the barcode to an external service over a network connection to receive the details back from the external service.

14. The method of claim 12, wherein requesting further includes asking a local service to use the aspects of the barcode to identify the itinerary, which is then used to acquire the next transaction.

15. The method of claim 11, wherein receiving further includes obtaining the details as a second barcode that is in a standard format that can be processed to acquire the next transaction.

16. The method of claim 11, wherein receiving further includes obtaining the details as a recognizable customer identifier that is used to acquire the next transaction for the customer.

17. The method of claim 11, wherein receiving further includes obtaining the details as the itinerary or as an identifier for the itinerary that is then used to acquire the next transaction for the customer.

18. A system, comprising:
    a cloud processing environment having one or more processors and configured and programmed with a disparate barcode processing service to execute the disparate barcode processing service; and
    a self-service device having one or more processors and configured and programmed to interact with the disparate barcode processing service over a network;
    the disparate barcode processing service is configured to handle a barcode that is not recognized by the self-service device when presented with the barcode from a customer, the disparate barcode processing service configured to identify an itinerary for the customer and acquire a transaction in the itinerary that can be processed by the self-service device, the disparate barcode processing service is configured to supply the transaction to the self-service device and the self-service device configured to process the transaction on behalf of the customer.

19. The system of claim 18, wherein the disparate barcode processing service is configured to identify the transaction as a second barcode recognized by the self-service device as the transaction for processing by the self-service device.

20. The system of claim 18, wherein disparate barcode processing service is configured to track actions against the itinerary in an audit log.

21. A processor-implemented method programmed in a non-transitory processor-readable medium and to execute on one or more processors configured to execute the method, comprising:
    receiving a barcode and metadata from a self-service device over a network connection, the barcode is unrecognized by the self-service device;
    identifying the self-service device with the metadata included with the barcode;
    associating the barcode with an itinerary of a customer;
    acquiring from the itinerary a transaction associated with the self-service device for the customer; and
    sending identifying information to the self-service device over the network connection to complete the transaction on behalf of the customer at the self-service device.

22. A processor-implemented method programmed in a non-transitory processor-readable medium and to execute on one or more processors configured to execute the method, comprising:
    receiving a first barcode from a self-service device over a network connection, the first barcode is unrecognized by the self-service device;
    associating the first barcode with an itinerary of a customer;
    acquiring from the itinerary a transaction associated with the self-service device for the customer; and
    sending identifying information as a second barcode to the self-service device over the network connection to complete the transaction on behalf of the customer at the self-service device, the self-service device being capable of recognizing the second barcode as the customer.

23. A processor-implemented method programmed in a non-transitory processor-readable medium and to execute on one or more processors configured to execute the method, comprising:

receiving a first barcode from a self-service device over a network connection, the first barcode is unrecognized by the self-service device;

associating the first barcode with an itinerary of a customer;

acquiring from the itinerary a transaction associated with the self-service device for the customer; and sending a second barcode to a portable device of the customer; and sending an instruction to the self-service device to request the second barcode from the portable device of the customer, the self service-device being capable of recognizing the second barcode as the transaction.

24. A processor-implemented method programmed in a non-transitory processor-readable medium and to execute on one or more processors configured to execute the method, comprising:

storing an itinerary associated with a customer;

receiving a barcode from a self-service device over a network connection, wherein the barcode is unrecognized by the self-service device, the barcode is associated with a customer identifier and an enterprise type;

associating the barcode with the itinerary of the customer;

acquiring from the itinerary a transaction that the self-service device is capable of handling based on the customer identifier and the enterprise type; and sending identifying information to the self-service device over the network connection to complete the transaction on behalf of the customer at the self-service device.

* * * * *